United States Patent [19]

Strom

[11] 3,822,919
[45] July 9, 1974

[54] APPARATUS AND METHOD FOR FLUIDIZING AND HANDLING PARTICULATES

[75] Inventor: Lars C. Strom, San Francisco, Calif.

[73] Assignee: Kaiser Industries Corp., Oakland, Calif.

[22] Filed: Apr. 2, 1973

[21] Appl. No.: 346,816

Related U.S. Application Data

[63] Continuation-in-part of Ser. No. 163,776, July 9, 1971, abandoned.

[52] U.S. Cl.................. 302/47, 222/195, 302/52
[51] Int. Cl........................................... B65g 53/16
[58] Field of Search............ 302/52, 53, 57, 45, 47, 302/56; 222/195

[56] References Cited
UNITED STATES PATENTS 2,805,897  9/1957  Yellott.............................. 302/29
2,930,512  3/1960  Paton................................ 222/195
3,202,461  8/1965  Paton................................. 302/52
3,275,197  9/1966  Eklund.............................. 222/195

FOREIGN PATENTS OR APPLICATIONS 1,152,058  1/1959  Germany............................. 302/52

Primary Examiner—Evon C. Blunk
Assistant Examiner—W. Scott Carson
Attorney, Agent, or Firm—James E. Toomey

[57] ABSTRACT

An improved apparatus and method for fluidizing and handling particulate material, wherein separate means are employed to change the angle of inclination of the main support for the particulate material and to fluidize the particulate material.

11 Claims, 17 Drawing Figures

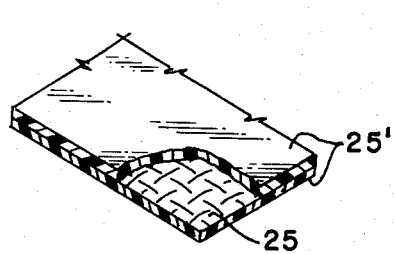
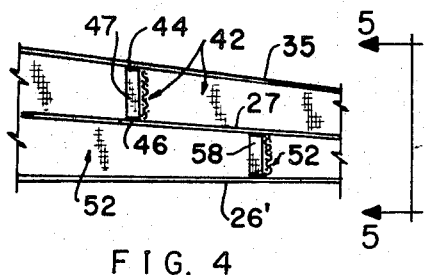
FIG. 2  FIG. 4
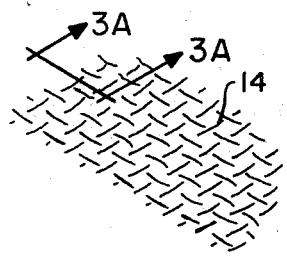
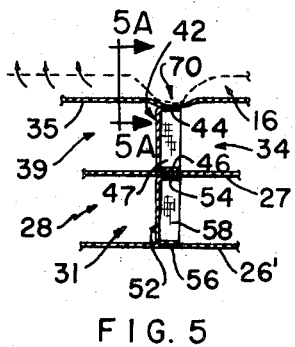
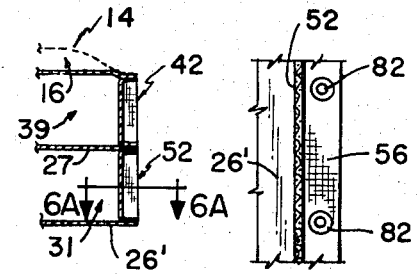
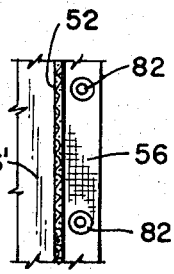
FIG. 3  FIG. 5  FIG. 6  FIG. 6A
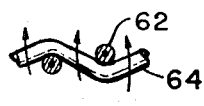
FIG. 3A
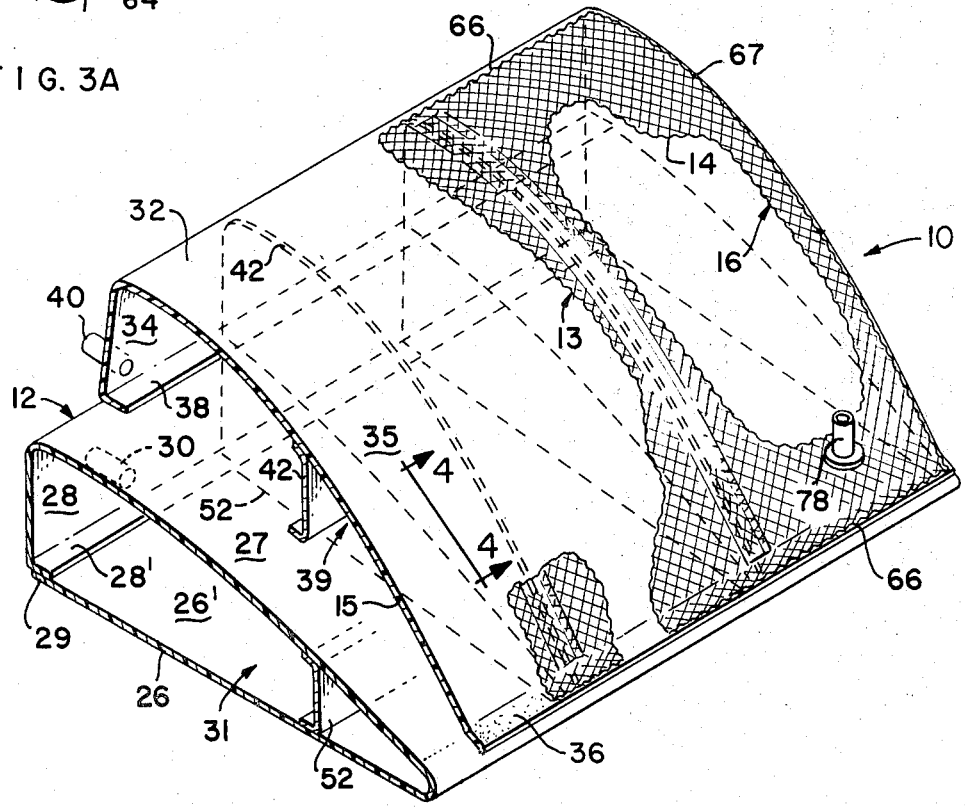
FIG. 1

3,822,919

APPARATUS AND METHOD FOR FLUIDIZING AND HANDLING PARTICULATES

CROSS REFERENCE TO RELATED APPLICATION

This is a continuation-in-part of Patent Application S.N. 163,776, filed July 19, 1971, now abandoned.

BACKGROUND OF THE INVENTION

This invention relates to a device for fluidizing and handling a mass of pulverulent or particulate material. More particularly, it relates to an improved multichambered and selectively inflatable device provided with separate means for fluidizing the particulate material being handled and for changing the angle of inclination of the main support for the material.

In the past, various devices have been employed for fluidizing and handling a mass of particulate material and were generally comprised of a single permeable element or medium which functioned both as the primary support for as well as the diffuser of a gaseous medium into the material to be fluidized. When this dual functioning medium, for example, was made of a flexible material, such as the canvas or cloth of the preselected permeability of the Schemm U.S. Pat. No. 2,527,455, gases at extremely high pressures are necessary to prevent collapse of the flexible material under loads, and it was difficult and economically impractical, if not impossible, to regulate with precision and uniformity the fluidization of the material across the supporting surface. The instant device, among other things, corrects the aforementioned problems which ordinarily attend use of a flexible permeable medium having the dual function aforesaid.

The instant device, in general, comprises a multipartitioned or chambered device of flexible or semiflexible material that can be used alone or incorporated in an overall material handling system. The device has a lower impermeable chamber and an upper permeable chamber. The lower chamber, when it is filled with a fluid medium, controls the slope or angle of inclination of an impermeable sheet that forms the top, or upper surface, of the chamber while the upper chamber, which includes a permeable membrane and serves as the main material fluidizing plenum chamber, is generally supported by, but isolated from, the first chamber. Thus when the lower chamber is in a deflated condition, the top sheet thereof conforms to and is supported by the wall of the bin or hold in which the device is installed. The permeable membrane is in turn supported by the top sheet so that the pressure at which air is supplied to the upper chamber need be sufficient only to fluidize the particulate material lying on device and not to support the weight of the particulate material. Only when the preponderance of the particulate material has been removed is the lower chamber inflated. Inflation of the lower chamber causes the top sheet thereof to tilt, in consequence of which the particulate material gravitates toward the low side of the sheet from where it is collected by conventional material handling apparatus.

SUMMARY OF THE INVENTION

It is a primary purpose of the instant invention to provide a multichambered or partitioned and preferably wedge-shaped envelope, when expanded, of flexible or semiflexible construction that can be used alone or incorporated in an overall material handling system. The walls of the lower and main chamber of this envelope are formed from a relatively impermeable material while the upper chamber walls are made up, at least in part, of a permeable material that is in direct contact with the pulverulent material to be fluidized and handled, e.g., conveyed. Selective expansion or contraction of the main lower chamber changes the basic overall slope of the upper surface of the discharge device, including the permeable surface or covering in direct contact with the material being handled. One or more sources of a fluid medium can be advantageously selectively connected to each of the chambers whereby the fluid medium, such as air, water, etc., is introduced to expand the impermeable chamber and selectively control the amount of slope or tilt of the upper surface of the device forming the bottom of the bin or other container. A gaseous medium, such as air, is of course separately introduced for fluidizing the material being handled. In short, segregation or isolation of the expansion or slope controlling operations from the fluidizing operation per se means that independence of the operation and more precise control and regulation of the overall material handling operation can finally be achieved in a very inexpensive fashion.

The preferred embodiment of the invention comprises a single impermeable chamber which functions as an expansion chamber and support means, in combination with an overlying permeable aerating cover means which functions as a plenum chamber and fluidizing means.

A desirable, and in many cases preferred, method of unloading the bin, silo, ship or other system containing the particulate of powdery material to be transferred, is initially to supply the gaseous medium to the aerating means which is in immediate contact with and underlying the bulk cargo of powdery material to be fluidized. With relatively low pressure the gas will fluidize the immediately adjacent powder so that it flows to the discharge trough from which it is delivered from the container system for further treatment or transfer as the case may be. At such time as it is appropriate to enhance the discharge of the bulk powdery material the impermeable chamber or expansion means is inflated and, by its design, an inclined bottom surface is created within the container which slopes towards the discharge means. This effect, combined with the fluidizing effect of the aerating means, enables the particulate material to gravitate toward one region so as to afford rapid completion of the unloading and transfer operation.

In another embodiment of the invention, the envelope, which in all instances to some extent simulates a wedge-shaped air mattress, when expanded, of selected dimensions, is comprised of upper and lower sections advantageously made up of a plurality of interconnected webs of a flexible material. The flexible material of the lower section should be relatively impermeable and can comprise a laminated fabric while the upper section that forms a simplified covering for the lower section is comprised of a permeable flexible material that is preferably abrasion resistant. It is generally manufactured in such fashion as to have the desired uniform permeability discussed in Schemm U.S. Pat. No. 2,527,455, and it can be stitched or otherwise bonded or secured, such as by suitable adhesive materials, to the sheet that defines the topside of the lower balloon-like member, i.e., the upper surface of the envelope forming the bottom of the container.

The lower balloon-like envelope section can include an intermediately disposed web divider for dividing the lower section into additional upper and lower chambers that are selectively inflatable and/or interconnected chambers separated by a skeletal framework of reinforcing rib-like elements.

If selected linear portions of the upper covering section are connected to opposed and underlying areas of the lower envelope section, the upper section can be further divided into trough-like segments in the areas wherein the upper and lower sections are secured or bonded together, such as by stitching, in the case where both sections are made of fabric and wherein the upper covering section is made, e.g., from the permeable multi-ply canvas fabric of U.S. Pat. No. 2,527,455.

A feature and advantage of a device of the present invention is that it can be installed in existing cargo carrying holds without significant structural modification to the hold, and can be rolled up and stored should the hold be needed for general cargo rather than bulk particulate material.

Another feature and advantage, particularly applicable to the embodiment having two superposed inflatable chambers, is that differential inflation of the chambers in two or more of the devices can compensate for such shift of cargo as occurs when a vessel lists during unloading.

BRIEF DESCRIPTION OF THE DRAWINGS

FIG. 1 is a fragmentary perspective view that illustrates an embodiment of an inflatable envelope of the instant invention and with the envelope being shown in a generally inflated condition;

FIG. 2 is an enlarged fragmentary perspective view taken at enlarged scale of a portion of FIG. 1;

FIG. 3 is an enlarged fragmentary perspective view taken at enlarged scale of a portion of the upper permeable section of the envelope shown in FIG. 1;

FIG. 3A is an enlarged sectional view as taken along line 3A—3A of FIG. 3;

FIG. 4 is a fragmentary sectional view taken along line 4—4 of FIG. 1;

FIG. 5 is an enlarged end view with parts removed and taken along line 5—5 of FIG. 4;

FIG. 6 is a cross-sectional view taken at enlarged scale of a portion of FIG. 1;

FIG. 6A is an enlarged cross-sectional view of the area of line 6A—6A of FIG. 6;

DETAILED DESCRIPTION

Figure 7:
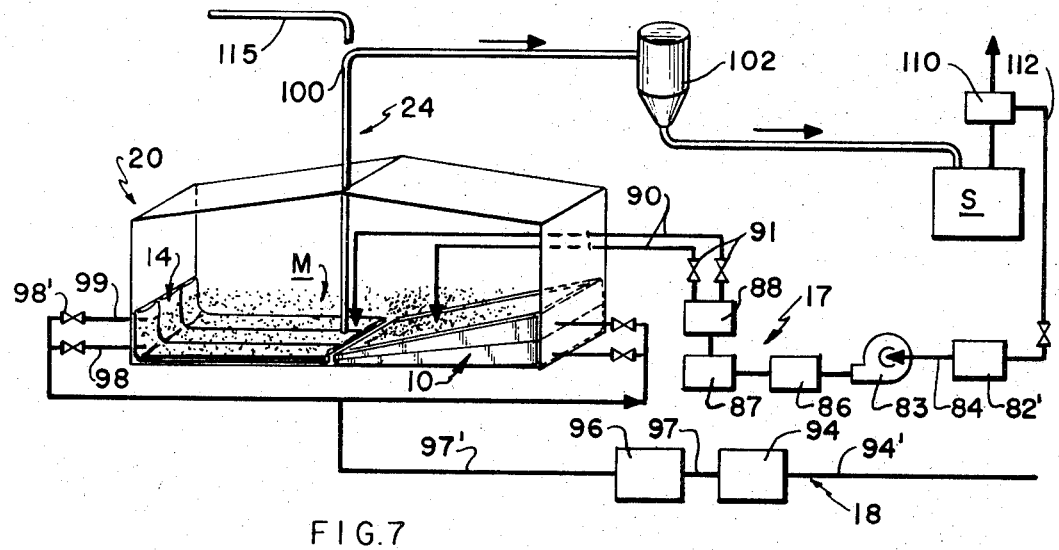
FIG. 7 is a diagrammatic and perspective view of a typical installation of the device of the instant invention.
Figure 8:
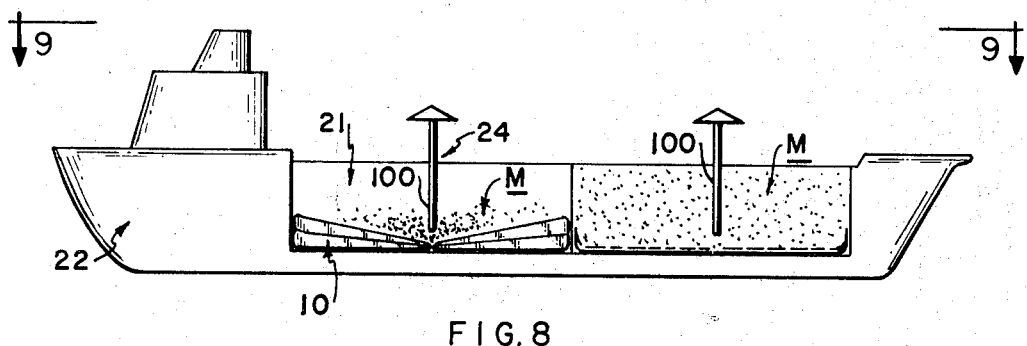
FIG. 8 is a diagrammatic view of an envelope of the instant invention when it is installed in the hold of a marine vessel.
Figure 9:
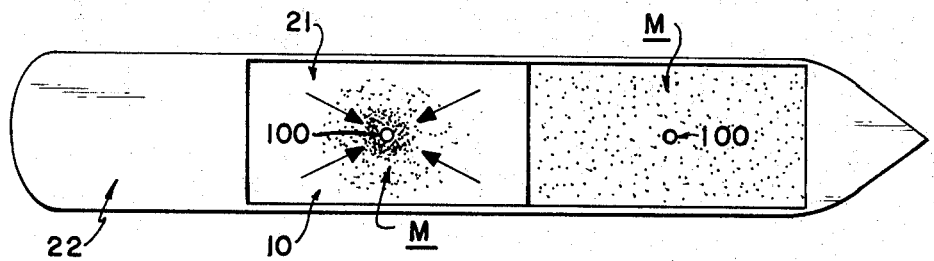
FIG. 9 is a top plan view taken along line 9—9 of FIG. 8.
Figure 11:
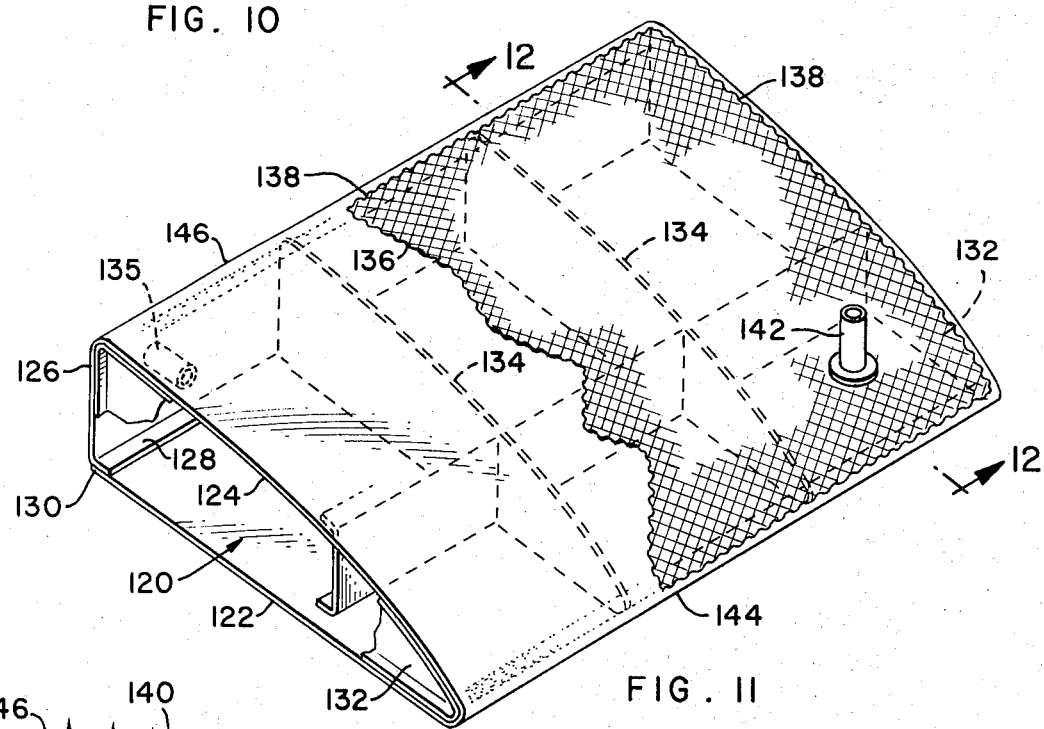
FIG. 11 is a perspective view of the preferred embodiment of the single envelope of the instant invention shown in inflated condition.
Figure 12:
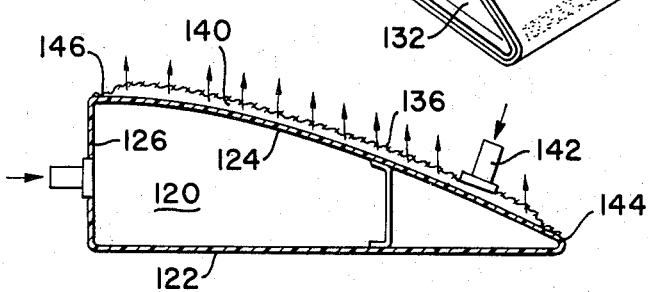
FIG. 12 is a sectional view taken along the plane designated by line 12—12 of FIG. 11.
Figure 13:
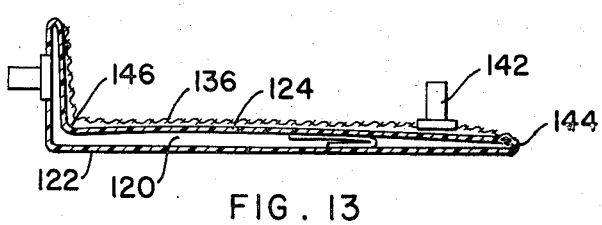
FIG. 13 is a sectional view corresponding to FIG. 12, but showing the envelope in a deflated condition.

With further reference to the drawings, FIGS. 1–6A illustrate useful embodiments of an inflatable multi-chambered load-carrying envelope 10, while FIGS. 7–9 illustrate a typical installation of the same in a container or the cargo hold of a vessel, although the device is useful in any bin, silo or other typical container for powdery bulk material. Various parts of the envelope can be made from flexible materials, and it is ordinarily selectively inflatable from a collapsed condition or flattened configuration to an expanded condition or wedge-shaped configuration as best indicated in FIG. 8 and FIG. 11. A gaseous medium (typically air) which flows through the permeable covering, located or stretched across the top of the envelope, acts to fluidize the particulate material $M$, such as alumina, cement, coal, iron ore concentrate, flour, etc., that rests directly on this covering portion of the envelope so that it can move in the manner of a fluid across the covering or membrane.

Figure 10:
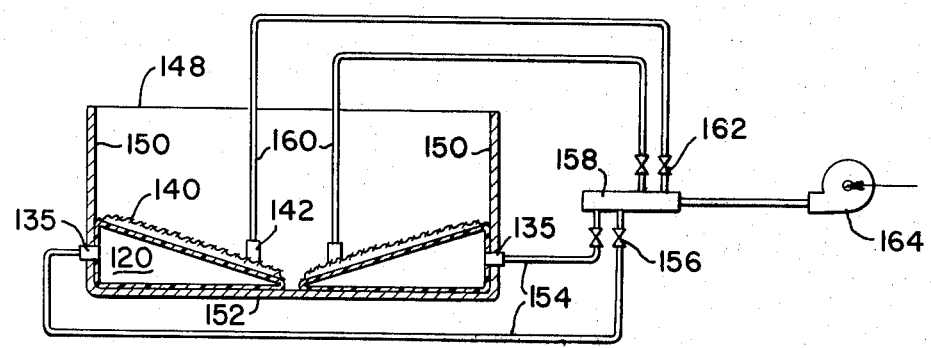
FIG. 10 is a simplified diagrammatic view of the preferred arrangement of the invention, utilizing a single common source of fluid media.

FIG. 7 of the application shows a separate source of gas for the aerating means which comprises the permeable chamber, and a separate source of fluid, gas or liquid, to the impermeable expansion means. These separate fluid media are desirable in certain operations where an inert fluidizing gas is required and a liquid is preferred for inflating the impermeable expansion chamber. However, FIG. 10 shows the usual and preferred arrangement of a single common source of fluid media such as compressed air for both the aerating means and the expansion means. Separate piping and valve controls are employed so that the fluid media can be selectively introduced. Under certain conditions the gaseous media can be introduced to both means simultaneously. However, as previously discussed, the most desirable system is to initially fluidize through the aerating means and thereafter introduce the fluid to the expansion chamber.

The foregoing selective control of fluid flow is essential to implement the principal advantage of this invention over the prior art, that is, the separation of the load-carrying function from the fluidizing function.

Referring to FIG. 1, envelope 10 generally includes a lower impermeable inflatable section 12 which can be multichambered and an upper permeable section 13 sealed off from section 12. Upper permeable section 13 is bounded on the top by a permeable membrane 14 and on the bottom by an impermeable sheet 15 which also constitutes the top wall of section 12. When the hold in which the device is installed is in a loaded condition, e.g., during transport or storage, section 12 is deflated so that the parts thereof are compressed by the weight of the material M into conformity with the bottom wall of the hold. When unloading is initiated, a fluidizing gaseous medium supplied to section 13 egresses through the interstices of membrane 14 and fluidizes the particulate material M thereon so that the material can be unloaded with conventional apparatus. When the level of the particulate material subsides to a degree at which further unloading is inefficient, section 12 is inflated whereby it assumes a wedge-shaped configuration, at least in one direction, at an angle to the horizontal that is sufficient to cause movement of the particular pulverulent material being handled upon the fluidization thereof.

In an advantageous embodiment of the invention, the walls of the lower envelope section 12 can be of a laminated construction and made up of a plurality of webbings of flexible impermeable materials. As indicated in FIG. 2, such materials can be of laminated construction including tightly woven fibrous or filament-like elements that form a central core 25. These elements can be synthetic or natural materials, such as polyesters or fiberglass materials. Opposed major faces of core 25 can be coated with an impervious flexible and abrasion-resistant facing 25' of neoprene, polyethylene and natural or synthetic rubber materials.

As indicated in FIG. 1, if section 12 is multichambered, a first webbing 26 can be suitably folded back upon itself to form a bottom wall 26', a top wall 27 and a back wall 28 that all define an expansion chamber 31. Wall 28 includes a foot flange 28' that is connected to the border 29 of the bottom wall by appropriate high strength epoxy resin adhesives or the like. If desired, flanges and borders 28' and 29 can be reinforced, e.g., by stitching (not shown). A fluid inlet tube 30 mounted in wall 28 can be used to introduce air or the like into expansion chamber 31.

Superimposed on and connected to wall 27 for the full length and width thereof is another impervious laminated web 32. Web 32 is likewise folded to form a back wall 34 and a top 35, which constitutes sheet 15, all of which act in conjunction with top wall 27 of chamber 31 to form a further expansion chamber 39. Back wall 34 likewise can have a foot flange 38 that is seamconnected to the top wall 27. A fluid inlet tube 40 similar to tube 30 can be suitably mounted in wall 34 for introducing air or the like into chamber 39.

Figure 4A:
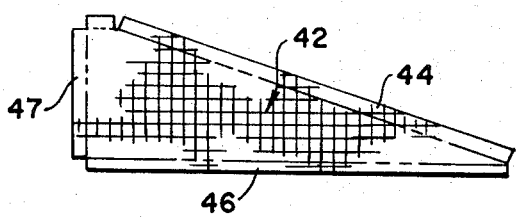
FIG. 4A is a side elevation of a typical section of as-fabricated webbing used for reinforcement purposes.

The interior of the various chambers 31 and 39 of this lower section 12 can be further subdivided, if desired, by means of various reinforcing webbing elements 42 of flexible or semiflexible and preferably pervious materials secured to wall 27, back wall 34 and top wall 35 of web 32. In order to accomplish this, the webbing 42, as indicated in FIG. 4A, can be suitably cut or fabricated so as to be of a relatively shallow triangular configuration with the top and bottom flaps 44 and 46 thereof being adhesively secured or seamed to top wall 35, wall 27 and the end flaps 47 being similarly anchored to back wall 34. Webbing 42 can be arranged crosswise to and secured to other sections of webbing 42, all as indicated in FIG. 4, in which case it would not be triangularly shaped, but instead would be somewhat rectangular and have parallel, top and bottom edges.

In any event the webbing elements 42, in effect, form an overall reinforcing skeletal framework within a given expansion chamber. Since the webbing elements can be of pervious material, the various cells formed by the webbing elements can be filled from a common gaseous medium source, e.g., air, by means of air inlet 40 disposed in wall 34. These cells can also be separate, independent, and selectively inflatable.

Lower chamber 31 of section 12 can be similarly reinforced by a skeletal framework made up of webbing elements 52 fabricated in a similar fashion as the webbing elements 42 of FIGS. 4, 4A and 5 and anchored by top, bottom and end tabs 54, 56 and 58, respectively, to the various wall elements 27, 26' and 28. As with webs 42, webs 52 divide lower chamber 31 into a number of cells that may or may not be in fluid intercommunication with each other. This reinforcing skeletal framework in the expansion chamber can materially increase the overall life expectancy of the envelope in that the various webbing elements serve to absorb the stresses and strains placed on the overall envelope. Moreover, the webbing elements constrain the chambers 31 and 39 to a wedge shape when inflated so as to assure that one boundary of the device is higher than the opposite boundary.

Web reinforcements 42 and 52 can also serve as end inserts for closing off the ends of chambers 39 and 31 of lower section 12 of envelope 10 in the fashion indicated in FIGS. 1 and 6. In this instance, however, webbing elements 42 and 52 would be constructed of an impervious material such as the material for webs 26 and 32, as aforedescribed.

By the system of the present invention it is possible to use available permeable flexible fabrics such as uniformly woven canvas, glass fibers, and the like to provide load-carrying or supporting requirements while simultaneously maintaining practical economic gas flows per unit area. By the prior art systems extremely high pressures are required to expand the load-carrying chamber before the aerating or fluidizing function can occur. Under such conditions the filaments forming the permeable fabric are stretched with resultant decrease in flow resistance and increased and erratic gas flow per unit area.

As an example with available fabrics, at a 1 psi pressure differential typical fabrics will have a permeability range from 2 to 7 cfm per square foot. This is about the flow rates that are desirable for fluidizing the cargo. However, with say 30 feet of bulk cement an internal pressure of about 20 psig is required to lift the cargo. The permeability of the best available fabrics at only 5 psi differential ranges from about 17 to about 45 cfm per square foot. Thus, to sustain 5 psi over a pad having an area of 100 sq. ft. (e.g., a square pad 10 ft. on a side) the compressor would have to supply 1,700 to 4,500 cfm. It is readily apparent that inflation pressures even approaching 20 psig would result in gas requirements beyond the realm of practicality.

With this invention, the pressure of the fluidizing gas supplied to the permeable aerating means can be kept at a reasonably low level, say in a range less than about 3 psig and preferably about 1 psig. Thus, the permeable portion of the device can be designed for a much lower pressure than if it had to perform the additional function of lifting the cargo.

Furthermore, much of the cargo can be unloaded before it becomes necessary to inflate the impermeable expansion chamber of the invention. Thus, it may be possible to design the impermeable section for lower pressures also if one desires to follow this operating sequence. For example, if 20 ft. of bulk cement were unloaded by aerating and fluidizing, the remaining 10 ft. could be lifted by applying about 6 psig to the impermeable expansion chamber. Furthermore, once the expansion chamber has been inflated to achieve the desired slope, the fluid supply to the expansion chamber can be discontinued. This is in marked contrast to the prior art permeable expansion chamber devices exemplified by the prior art which must continuously sustain the gas supply in order to maintain the desired sloping surface.

With further reference to the drawings and, in particular, FIGS. 3 and 3A, permeable covering 14 can be made of canvas, as in the Schemm Patent, or of woven polyester cloth or even of woven fiberglass cloth 62. An adherent abrasion-resistant and relatively friction-free coating 64, for example, a suitable coating or film of polytetrafluoroethylene, can be applied to the individual fiberglass filaments to improve the friction-free characteristics of the overall surface of covering 14.

Covering 14 is of a length and width substantially corresponding to the length and width of top wall 35 of web 32. Opposed side edges 66 of covering 14 are seamed to the top of right side seam 36 of top wall 35 and to the top left side of the top 35 adjacent the fold between wall 34 and top 35 when web 32 is inflated. Opposed end edges 67 of covering 14 (only one of which is shown for the sake of brevity in FIG. 1) are seamed to opposed end edges of the top wall 35. When all the peripheral edges 66 and 67 of covering 14 are secured to the upper side of top wall 35, a plenum chamber 16 will be formed between covering 14 and the top wall 35, all as indicated in FIGS. 1 and 5–6.

A separate source of gas under pressure, e.g., air, is supplied to the plenum chamber 16 by a suitable air inlet 78 mounted in covering 14.

It is to be understood that the material used for the permeable covering 14, if made of cloth, can be impregnated with water-proofing and/or heat-resistant compounds, depending upon the particular materials to be handled by the device. In other words, the flexible covering material lends itself to all sorts of permutations and combinations during manufacture, e.g., making the covering 14 of asbestos, fiberglass and/or canvas threads.

Figure 5A:
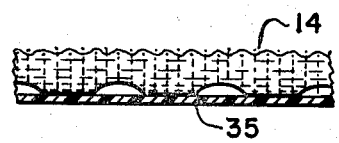
FIG. 5A is an enlarged and partial sectional view as taken along line 5A—5A of FIG. 5.

In a further advantageous embodiment of the invention, when selected linear portions of covering 14 are connected such as by adhesives, stitches or eyelets to underlying portions of top wall 35 of web 32, troughs 70 are formed in the covering 14 which contribute to the downward flow of material in contact with and across covering 14, all as depicted in FIGS. 5 and 5A.

Various fluidizing gases can be used, depending upon the results desired, although the most common and inexpensive gaseous fluidizing medium is compressed air. This fluidizing medium or compressed air can, in turn, be a cold air to help cool hot material being handled or conveyed, or dehumidified air to dry out or maintain the dryness of the particular material passing over covering 14. Even a recycled inert gas can be used in certain instances, depending on the material being handled. The physical characteristics and properties of the various components of envelope 10, e.g., the length, width, thickness and strength of each component, are of course dictated to a large extent by the load-carrying requirements of a given envelope 10 and its desired size when expanded.

With further reference to the drawings and, in particular, FIGS. 7–9, the material-handling devices of the instant invention are shown as being installed in the cargo hold of a vessel. Although this is one use that will now be described in some detail, it is to be understood that the device of the instant invention can be used in any environment, i.e., system or container, involving handling of pulverulent or powdered materials by fluidizing the same, such as conveyors of the type shown in Schemm U.S. Pat. No. 2,527,455, cement silos, bulk material carriers, hoppers and as substitutes for the fluidizing devices of U.S. Pat. No. 3,375,042 that are located in the cargo hold of a vessel.

In an advantageous embodiment of the invention and in order to prevent accidental shifting of an envelope when the envelope is placed in the bottom of a vessel's cargo hold, the envelope can be temporarily tied down or otherwise anchored in place by means of reinforced eyelets 82 through which tie down ropes, wires, etc., can be threaded and secured to posts or holders in the cargo hold 21 of the vessel 22 in the manner illustrated in FIG. 6A. Prior to use the envelopes 10 can be left in a collapsed condition in the bottom of the ship's hold and dry cargo loaded over the envelopes. Alternately, the envelopes can have been carried in rolled-up fashion in a suitable storage compartment until needed and then unrolled into place on the bottom wall of the compartment and the bulk particulate material then deposited upon the envelopes. In any event, the envelopes in the deflated condition occupy insignificant volume in the compartment.

When the bulk or particulate material is to be unloaded, a source of fluidizing gas is connected by aerating system 17, or the like, to the various fittings 78. System 17 can be comprised, for example, of a suitable inert gas generator 82' of the type sold by C. M. Kemp Mfg. Co., Glen Burnie, Md. under Model No. LDV-15 and the usual blower fan 83 connected to the outlet conduit 84 of generator 82'. Depending upon the material being handled, a source of gaseous fluid, other than inert gas, can be generated or supplied by generator 82' in appropriate fashion. if desired, system 17 can be provided with a standard air dehumidifier unit 86 of the type sold by Cargocaire Engineering Corp., Amesbury, Mass., under Model No. 2250 SB. By employment of the dehumidifier the moisture content of the fluidizing gas supplied by system 17 can be fully controlled, thereby facilitating the handling of a material having hygroscopic properties by the envelope of the instant invention. If desired, system 17 can include a heat exchanger, such as air cooler 88, of standard design for cooling the material $M$ and minimizing the danger of explosion, where, for example, the mass $M$ is chemically active at high temperatures. The heat exchanger obviously can be a heater instead of a cooler. A branch conduit 90 extends from the air cooler or heat exchanger 88 and is connected at its outer end to inlet 78 of its associated envelope 10. A valve 91 can be connected to conduit 90 for controlling the admission of a gas into the plenum chamber 16 of a section 13 of a given envelope 10.

In a further advantageous embodiment of the invention and in order to obtain a pulsation or periodic oscillation of the porous membrane-like covering 14, system 17 can include a standard type air jet pulsator or sonic oscillator device 87 of the type shown, for example, in U.S. Pat. No. 3,519,310 to Holm, et al. The use of a pulsator or oscillator device 87 in effect means that the membrane-like covering 14 of an envelope 10 can function in the manner of a unique vibrating screen as well as an improved material aerating device.

A system 18 used to inflate or expand the envelope device 10 can include a master control unit 94 and a pulsator 96 connected to the outlet conduit 97 of control unit 94. Branch conduits 98 and 99 are connected to inlets 30 and 40 of the lower section 12 of envelope 10 and, in turn, are connected to main line 97' from pulsator 96. A control valve 98' can be connected to a branch conduit 98 or 99, as indicated in FIG. 7. The input 94' of control unit 94 is connected to a source of fluid (not shown).

As further indicated in FIGS. 7–9, a suction tube 100 of an overall vacuum discharge system 24 can be lowered into the mass $M$ and into the center of the container 20 or the cargo hold 21 of the vessel 22. Tube 100 is connected to a suitable vacuum drawing or pulling device 102 and operates to withdraw the fluidized mass $M$ from container 20 or a hold 21 and transmit the same to a storage area $S$ or the like. During this unloading operation, the gaseous medium from system 17 flows through the various plenum chambers 16 and fluidizes the mass $M$ of particulate material resting upon the various permeable coverings 14 that make up the bottom of the cargo hold 21 being emptied. When the level of particulate material M subsides to a point near the bottom wall of the hold and near the bottom of suction tube 100, system 18 is activated so as to inflate chambers 31 and 39 and to tilt sheet 35 and plenum chamber 16 of which the sheet is a part. Inflation of one or both of the chambers causes one boundary of the plenum chamber to reside at a level higher than the opposite boundary. Consequently, further supply of the gaseous fluidizing medium to plenum chamber 16 causes the particulate material to gravitate toward the lower boundary of the device. As seen in FIGS. 7 and 8, suction tube 100 is disposed adjacent such lower boundary so that the particulate material gravitates toward the suction tube. Accordingly, virtually all particulate material can be removed from a hold or container in which devices of the present invention are installed.

As shown in FIGS. 7 and 8, it is desirable to employ complemental pairs of the devices which are installed so that the lower boundaries of each device of a pair are positioned in adjacent parallelism with one another. The upper boundaries of each device of a pair are located remote from one another so that upon inflation of section 12, the fluidized material M will gravitate toward the center of the pair, at which location suction tube 100 is disposed.

In FIG. 8 the devices are shown installed to move particulate material M in a fore and aft direction within hold 21. Comprehended within the present invention is installation of the devices so that the particulate material is moved athwartship toward the center. The embodiment of the invention shown in FIG. 1 is particularly advantageous in this mode of operation because ships are likely to list during unloading so that one side of the ship is relatively high and one side of the ship is relatively low. Inflation of both chambers 31 and 39 of the device on the low side and inflation of only one chamber 39 of the device on the high side expedites uniform movement of the particulate material toward suction tube 100 which is positioned adjacent to confronting lower boundaries of the devices.

Divorcing or isolating the aeration and expansion chambers of an envelope 10 also means that air pulsators or sonic oscillating devices 87 and 96 of both systems 17 and 18 can be simultaneously operated whereby the vibration of the membrane 14 of a given envelope 10 is maximized as the membrane-like covering 14 takes on the characteristics of a vibrating screen so that the last bit of particulate can be dislodged from the covering 14 during material handling. Thus the covering also tends to have enhanced self-cleaning characteristics. When inert gas is used for fluidization purposes, it can be collected from the dust collector 110 of the exhaust stack and recycled back into the aerating system through line 112 in the manner shown in FIG. 7. Vibration or oscillation plus controlled and independent sloping of membranes 14 under all types of material handling conditions means that an extremely versatile and efficient compact pulverulent material handling and/or transporting device has been made available to the industry.

The instant device can be incorporated in existing fluidizing operations and facilities with a minimum of alterations being required for such facilities. Because of the improved construction of envelope 10, and the fact that it can be collapsed and stored when not in use, a cargo hold 21 for a vessel, for example, is not restricted to merely carrying a particulate mass M. Moreover, an envelope is not limited to use at the bottom of a container vessel's hold; for example, it could be suspended on the side wall of the vessel's hold with its covering 14 being in direct contact with the bulk material M. Since the envelope is relatively flat until it is inflated, a flat bottomed container within which the device 10 may be disposed, has substantially maximum space available within its interior for carrying a load. Although a suction tube 110 has been disposed for removing the particulate material mass M upon fluidization of the mass by envelope 10, the fluidized mass can be removed by other suitable means, for instance, a gravity discharge opening (not shown) in the bottom of a container 20 or vessel cargo hold and the vessel hold 21, or container 20, can also be filled by the usual filler tube device 115, etc.

Shown in FIGS. 10–13 is a simplified and often preferred embodiment of the device of the present invention and the method for using it. The device includes a single inflatable chamber 120 which can be formed by a continuous web of impermeable material folded to include a bottom sheet 122, a top sheet 124 and a side sheet 126. As in the embodiment described hereinabove in connection with FIG. 1 side sheet 126 can have a flange 128 which is adhesively or otherwise joined to the margin of bottom sheet 122 as at 130 to form the requisite wedge shape structure. The ends of such structure are closed by generally triangular shaped end panels 132 which are suitably secured in air tight relation to the balance of the structure to form an impermeable envelope. Intermediate end panels 132 can be disposed one or more panels 134 which are congruent to the end panels and which maintain the envelope in the desired wedge shaped configuration upon inflation thereof. The edges of intermediate panels 134 are joined to the interior surfaces of sheets 122, 124 and 126 that define chamber 120. Intermediate panels 134 can be either permeable or impermeable depending on whether it is desired to inflate chamber 120 in its entirety at one time or to effect selective inflation of parts of the chamber. In the embodiment shown in FIG. 11 intermediate panels 134 are permeable so that introduction of compressed air or the like through a single inlet fitting 135 inflates the device to the condition shown in the figure. In the case where intermediate panels 134 are impermeable additional air inlets to each portion of chamber 120 are required.

Secured to the upper surface of top sheet 124 is a permeable membrane 136. Membrane 136 is of the same material as is membrane 14 described above in connection with FIG. 1. Membrane 136 is approximately congruent to top sheet 124 and the periphery of the membrane is secured to the periphery of the top sheet such as by stitching and/or adhesive indicated at 138. Accordingly, a plenum chamber 140 is defined between the permeable membrane and impermeable top sheet 124. For delivering a gaseous fluidizing medium to the plenum chamber an inlet fitting 142 is provided in membrane 136.

Sheet 124 and the plenum chamber 140 associated therewith can be characterized as having opposite boundaries 144 and 146. When chamber 120 is deflated (see FIG. 13) the boundaries lie at roughly the same level; when chamber 120 is inflated, however, boundary 146 is raised to a level higher than boundary 144 so that flowable material lying on membrane 136 will gravitate toward lower boundary 144. This phenomenon is exploited in performing the method of the present invention.

The operation of this embodiment of the present invention is substantially identical to that described hereinabove in connection with FIGS. 1–9. For using the invention in a container 148 that has sidewalls 150 and a bottom wall 152, a complemental pair of the devices is placed upon the bottom wall within the container. The inlet fittings 135 to the respective chambers 120 can be connected as shown through openings in sidewalls 150 to air supply pipes 154 which are connected through valves 156 to a manifold 158. It will be noted that the lower boundaries 144 of the respective devices are disposed in adjacent parallelism at the midpoint of the container and that the opposite boundaries 146 are remote from such midpoint. Plenum chambers 140 of the respective devices are supplied with a fluidizing gas, in this example air, through pipes 160 which are connected to respective inlet fittings 142. Pipes 160 connect to manifold 158 through valves 162. Manifold 158 is supplied with compressed air from the suitable source, such as a centrifugal fan 164. When the container 148 is filled with particulate material, chambers 120 of the respective devices are deflated so that each of the devices assumes the position shown in FIG. 13. In such position the device of the invention occupies insignificant volume within the container. When it is desired to unload the particulate material from container 148, fan 164 is started and valves 162 are open to deliver air to the plenum chambers 140 of the respective devices. Such air assists in fluidizing the particulate material which is unloaded from a location adjacent to midpoint of bottom wall 152 of the container. When the level of the particulate material in container 148 has subsided to a level at which further discharge of material is inefficient, chambers 120 of the respective devices are inflated by opening valves 156. Delivery of fluidizing air through pipes 160 to plenum chambers 140 of the respective devices is continued and because of the slope or tilt of the respective top sheets 124, the particulate material gravitates toward the midpoint of bottom container wall 152 from where it is removed by convention material handling apparatus. Thus, it will be seen that virtually all of the particulate material can be removed from the container.

Advantageous embodiments of the instant invention have been shown and described. Various changes and modifications can be made therein without departing from the scope of the appended claims. As used in the appended claims the term "cargo hold" shall mean the hold of a vessel, a bulk material carrier, a silo, a storage bin, a conveyor, take off and dumping devices, various aerating devices, or a container for handling fluidized materials.

I claim:

1. A device for use in handling and transporting pulverulent materials comprising in combination an expansion chamber and support means, a plenum chamber and aerating membrane-like covering means disposed upon and separately sealed from said expansion chamber and support means, means for supplying a fluid medium to said expansion chamber and support means, and separate means for supplying a gaseous medium to said plenum chamber and aerating membrane-like covering means so as to effect fluidization of the pulverulent material disposed upon said aerating membrane-like covering means, said membrane-like covering means being made from a fabric having abrasion resistance properties and one which is coated with a relatively friction-free film.

2. A device as set forth in claim 1 in which said film is composed of polytetrafluoroethylene.

3. A device for use in handling and transporting pulverulent materials comprising in combination an expansion chamber and support means, a plenum chamber and aerating membrane-like covering means disposed upon and separately sealed from said expansion chamber and support means, means for supplying a fluid medium to said expansion chamber and support means for expanding said expansion chamber and support means, and separate means for supplying a gaseous medium to said plenum chamber and aerating membrane-like covering means so as to effect fluidization of the pulverulent material disposed upon said aerating membrane-like covering means, said means for supplying the gaseous medium including means for controlling the temperature of said gaseous medium prior to passage of the medium into the plenum chamber portion of said plenum chamber and aerating membrane-like covering means.

4. A system for handling and transporting finely divided pulverulent material comprising the combination of a cargo hold, an expansion chamber and support means mounted in said hold, a plenum chamber and aerating membrane-like covering means disposed upon and separately sealed from said expansion chamber and support means, means for supplying a fluid medium to the chamber portion of said expansion chamber and support means, separate means operable independently of and simultaneously with said fluid medium supplying means for supplying an inert gaseous medium to the plenum chamber portion of said plenum chamber and aerating membrane-like covering means so as to effect fluidization of the finely divided pulverulent material disposed upon said aerating membrane-like covering means, means for recycling said inert gaseous medium in said system, and means for transferring the fluidized material from the cargo hold to another location.

5. A system for handling and transporting finely divided pulverulent material comprising the combination of a cargo hold, an expansion chamber and support means mounted in said hold, a plenum chamber and aerating membrane-like covering means disposed upon and separately sealed from said expansion chamber and support means, means for supplying a fluid medium to the chamber portion of said expansion chamber and support means for selectively expanding said expansion chamber and support means, separate means operable independently of and simultaneously with said fluid medium supplying means for supplying a gaseous medium to the plenum chamber portion of said plenum chamber and aerating membrane-like covering means so as to effect fluidization of the finely divided pulverulent material disposed upon said aerating membrane-like covering means, means for dehumidifying said gaseous medium prior to passage thereof to said plenum chamber means, and means for transferring the fluidized material from the cargo hold to another location.

6. Apparatus for use in a storage container for pulverant material which container has a rigid load supporting bottom wall, said apparatus comprising an impermeable sheet conformable to said bottom wall and having first and second boundaries, a flexible fluid permeable membrane overlying said sheet and having a periphery joined to said sheet so as to define a plenum between said sheet and said membrane, means for tilting said sheet so that said first boundary is at a vertical level above said second boundary, and means for supplying fluid to said plenum so that pulverant material on said membrane is fluidized and caused to gravitate toward said second boundary, said sheet tilting means including a plurality of flexible impermeable walls joined to define a self-contained inflatable wedge-shaped chamber wherein one of said walls constitutes said sheet.

7. Apparatus according to claim 6 in combination with a suction tube depending into said container, said suction tube having an inlet opening adjacent to said second boundary.

8. A system for handling and transporting finely divided pulverulent material comprising the combination of a cargo hold, an expansion chamber and support means mounted in said hold, a plenum chamber and aerating membrane-like covering means disposed upon and separately sealed from said expansion chamber and support means, means for supplying a fluid medium to the chamber portion of said expansion chamber and support means for selectively expanding said expansion chamber and support means, separate means operable independently of and simultaneously with said fluid medium supplying means for supplying an inert gaseous medium to the plenum chamber portion of said plenum chamber and aerating membrane-like covering means so as to effect fluidization of the finely divided pulverulent material disposed upon said aerating membrane-like covering means, means for recycling the inert gaseous medium in said system, and means for transferring the fluidized material from the cargo hold to another location.

9. A system for handling and transporting finely divided pulverulent material comprising the combination of a cargo hold, an expansion chamber and support means mounted in said hold, a plenum chamber and aerating membrane-like covering means disposed upon and separately sealed from said expansion chamber and support means, means for supplying a fluid medium to the chamber portion of said expansion chamber and support means for selectively expanding said expansion chamber and support means, separate means operable independently of and simultaneously with said fluid medium supplying means for supplying a gaseous medium to the plenum chamber portion of said plenum chamber and aerating membrane-like covering means so as to effect fluidization of the finely divided pulverulent material disposed upon said aerating membrane-like covering means, said supplying means including means for dehumidifying the gaseous medium prior to passage of said gaseous medium to the plenum chamber portion of said plenum chamber and membrane-like covering means and means for transferring the fluidized material from the cargo hold to another location.

10. A system for handling and transporting finely divided pulverulent material comprising the combination of a cargo hold, an expansion chamber and support means mounted in said hold, a plenum chamber and aerating membrane-like covering means disposed upon and separately sealed from said expansion chamber and support means, means for supplying a fluid medium to the chamber portion of said expansion chamber and support means for selectively expanding said expansion chamber and support means, separate means operable independently of and simultaneously with said fluid medium supplying means for supplying a gaseous medium to the plenum chamber portion of said plenum chamber and aerating membrane-like covering means so as to effect fluidization of the finely divided pulverulent material disposed upon said aerating membrane-like covering means, said supplying means including means for controlling the temperature of said gaseous medium prior to introduction of the gaseous medium into said plenum chamber portion of the plenum chamber and membrane-like covering means, and means for transferring the fluidized material from the cargo hold to another location.

11. A device for use in handling and transporting pulverulent materials comprising in combination an expansion chamber and support means, a plenum chamber and aerating membrane-like covering means disposed upon and separately sealed from expansion chamber and support means, means for supplying a fluid medium to said expansion chamber and support means for expanding said expansion chamber and support means, separate means for supplying a gaseous medium to said plenum chamber and aerating membrane-like covering means so as to effect fluidization of the pulverulent material disposed upon said aerating membrane-like covering means, and means for dehumidifying said gaseous medium prior to passage of the same into said plenum chamber means.

* * * * *